United States Patent [19]

Smith

[11] 4,372,601

[45] Feb. 8, 1983

[54] AIR DRAG REDUCING TAIL GATE

[76] Inventor: Michael C. Smith, 211 Bonaventure Dr., LaGrange, Ga. 30240

[21] Appl. No.: 268,101

[22] Filed: May 28, 1981

[51] Int. Cl.³ .............................................. B60J 5/12
[52] U.S. Cl. .................................................. 296/50
[58] Field of Search ............... 296/50, 51; 49/40, 350; 160/DIG. 4

[56] References Cited

U.S. PATENT DOCUMENTS

| | | | |
|---|---|---|---|
| 1,764,615 | 6/1930 | Edwards | 296/50 |
| 2,543,143 | 2/1951 | Wells et al. | 296/50 |
| 3,567,209 | 3/1971 | Lathers | 296/50 |
| 3,785,695 | 1/1974 | Conkle | 296/50 |

*Primary Examiner*—Richard A. Bertsch
*Attorney, Agent, or Firm*—Michael Carlis Smith

[57] ABSTRACT

An air drag reducing tail gate adapted to fold into the utility compartment of a pick-up truck or the like to promote fuel efficiency while eliminating unsafe conditions inherent in operation of a pick-up truck, trailer or like vehicle with a tail gate extending out of the area occupied by the body of the vehicle.

8 Claims, 4 Drawing Figures

U.S. Patent  Feb. 8, 1983  4,372,601
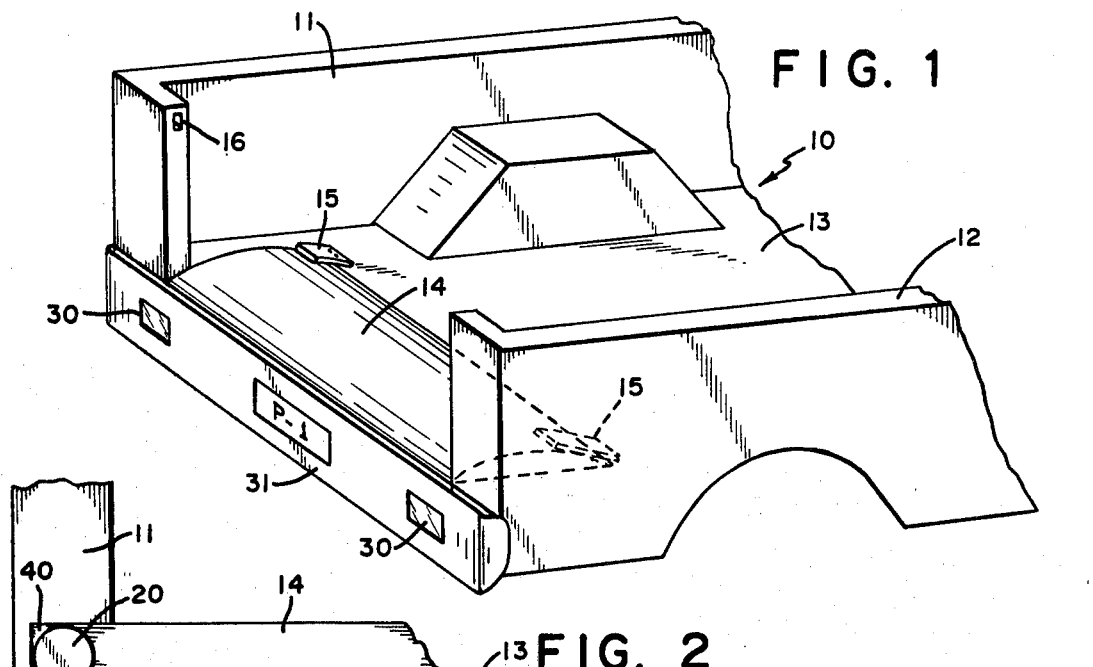
FIG. 1
FIG. 2
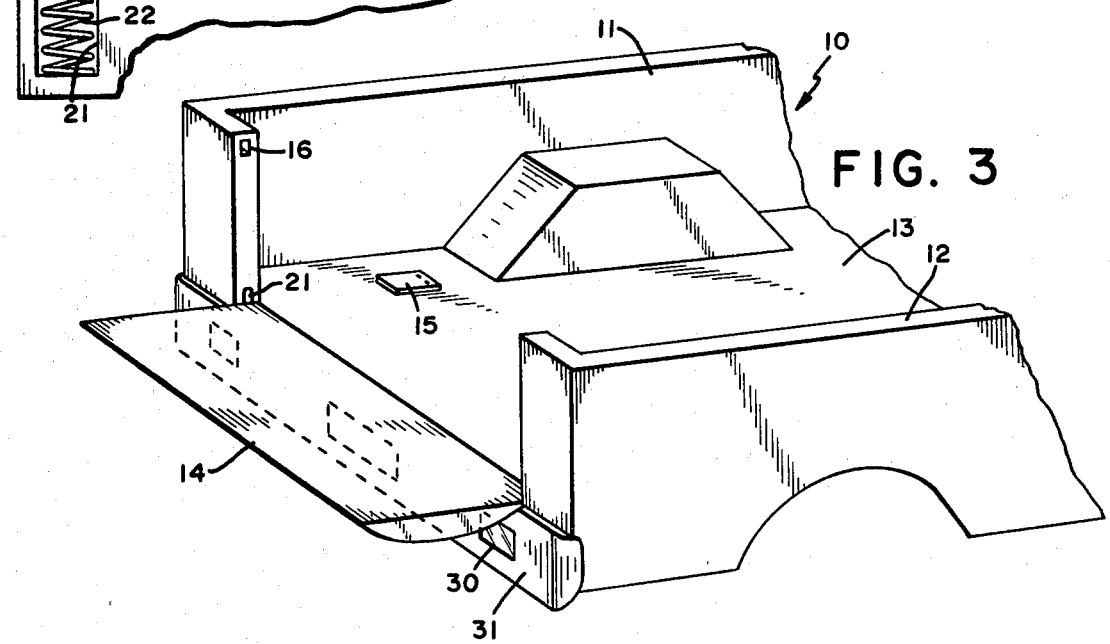
FIG. 3
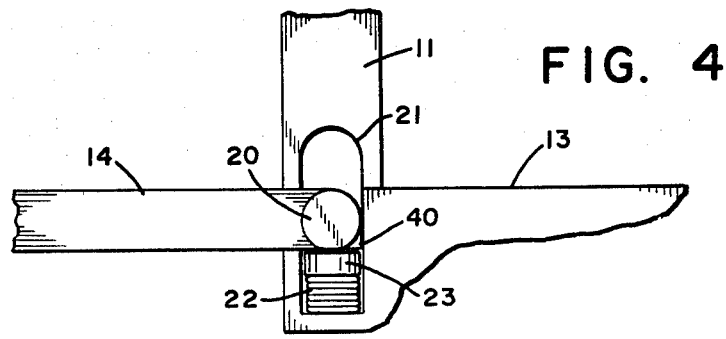
FIG. 4

AIR DRAG REDUCING TAIL GATE

BACKGROUND OF THE INVENTION

1. Field of the Invention

The present invention relates generally to motor vehicles and to apparatus for increasing fuel efficiency, and specifically to an air drag reducing tail gate for a pick-up truck, trailer or the like.

2. Description of the Prior Art

It is believed that relevant art may appear in class 180, in class 280, and in subclass 50 and later subclasses of class 296.

Tail gates are well known in the art. When used on a vehicle such as the pick-up truck shown in U.S. Pat. No. 3,734,560, a tail gate is normally a substantially flat rectangular piece of metal forming the rear wall of a utility or cargo compartment. It normally has at least one solid surface for retaining objects within the utility compartment and is hinged along one edge for rotation away from the body of vehicle to allow ingress and egress. While the hinged edge is normally the bottom edge as in pick-up trucks, it may be hinged at the top as in dump trucks. In either case the tail gate normally swings outward for loading, unloading or dumping. Exceptions are shown in U.S. Pat. No. 1,764,615 where a member is allowed to swing inward and upward to promote removal of coal and U.S. Pat. No. 3,567,209 where a station wagon tail gate slides down into the body of the vehicle. While in usual vertical position, the tail gate of a moving pick-up truck is in the wake of the passenger compartment of the vehicle. Air passing over and around the passenger compartment turbulently flows into the utility compartment and is met by the vertical forward face of the tail gate creating significant air drag on the vehicle. While the drag on the tail gate is normally much less than that on the leading portion of the vehicle, it is significant and requires substantial additional force to move against the air friction. This fact has been recognized by vehicle users because of rising fuel costs.

Several attempts have been made to reduce air drag on tail gates in order to increase fuel efficiency, but all have resulted in undesired consequences. The first and most popular attempt has been to merely open the tail gate outward into a vertical cantilevered position, but this is dangerous to following drivers because the added length is not readily apparent and tail lights are often less visible. Additionally, leaving the tail gate sticking out is dangerous while manuvering the vehicle backward. A second attempt has been to completely remove the tail gate from the vehicle, but absence of the tail gate reduces the usefulness of the vehicle and is quite inconvenient to frequently replace. The third attempt has been to replace the conventional tail gate with one having numerous apertures such as that shown in U.S. Pat. No. 4,136,905 to allow air to pass through, but this attempt is also not completely successful because as aperture quantity and size increases hauling usefulness decreases, and as aperture quantity and size decreases air drag increases. Such open mesh tail gates reduce air drag a little but limit the vehicle to hauling material no smaller than the mesh openings.

SUMMARY OF THE INVENTION

The present invention solves these problems by providing for maximum safety, maximum utility and minimum air drag. This invention is an air drag reducing tail gate adapted to fold into the cargo compartment of a pick-up truck or like vehicle to promote fuel efficiency while eliminating unsafe conditions inherent in operation of the vehicle with its tail gate extending out of the area occupied by the body of the vehicle.

Thus a major object of this invention is to provide an air drag reducing tail gate adapted to fold into the cargo compartment of a pick-up truck or like vehicle to promote fuel efficiency while maintaining utility and safety.

BRIEF DESCRIPTION OF THE DRAWINGS

While the specification concludes with claims particularly pointing out and distinctly claiming the subject matter which is regarded as the invention, it is believed that the invention, objects, features and advantages thereof will be better understood from the following description taken in connection with the accompanied drawings in which like parts are given like identification numerals and wherein:

FIG. 1 is an elevation of part of a pick-up truck comprising the present invention in air drag reducting mode;

FIG. 2 is an elevation of detail parts of the present invention in air drag reducing mode;

FIG. 3 is an elevation of part of a pick-up truck comprising the present invention in conventional loading mode; and FIG. 4 is an elevation of detail parts of the present invention in conventional loading mode.

DESCRIPTION OF THE PREFERRED EMBODIMENT

FIG. 1 illustrates a portion of a conventional pick-up truck body indicated generally at 10 having a first side wall 11, a second side wall 12, a bed 13 and the air drag reducing tail gate 14. In hauling mode, the tail gate 14 is vertically aligned to form a back wall connecting the first side wall 11 and the second side wall 12 to form a utility or cargo compartment. While tail gate 14 may be moved adjacent to any other member forming the cargo compartment, in air drag reducing mode as shown in FIG. 1, the tail gate 14 has been rotated forward of vertical along pivot means 20 of FIG. 2 until the forward face of the tail gate 14 meets the top surface of the bed 13 in substantially uniform contact. While the weight of the tail gate 14 is normally sufficient to keep the tail gate 14 in adjacent alignment on the bed 13, retention means 15 are provided to assure retention of the tail gate 14 in this prone position. In this manner, air passing over and around forward portions of the truck body 10 and between side walls 11 and 12 will pass unrestricted out of the truck body area thus reducing drag on the vehicle and improving fuel efficiency.

FIG. 2 illustrates the pivot means 20 upon which the tail gate 14 rotates. Pivot means 20 extend from each side of the tail gate 14 into vertical pivot raceways 21 inscribed in adjacent portions of the first and second side walls 11 and 12 to provide for vertical movement of pivot means 20. While in air drag reducing mode, the pivot means 20 are located in the upper portion of the raceways 21 by the alignment of the tail gate 14. While in hauling mode, the pivot means 20 are held in upper portion of the raceways 21 by compression springs 22 having spring caps 23 for providing a bearing surface against the pivot means 20. The springs 22 provide an upward force sufficient to maintain the weight of the tail gate 14 above the bed 13 and cooperate with securement means 16 of FIG. 1 to retain the tail gate 14 in proper vertical alignment during hauling. As FIG. 3 and FIG. 4, illustrate, while the tail gate 14 is rotated outward for loading, the weight of the cantilevered tail gate 14 plus the weight of the material being loaded compresses the springs 22 allowing the pivot means 20 to move downward to the lower portion of the raceway 21 to provide for ease of loading by placing the forward surface of the tail gate 14 generally in the same horizontal plane as the bed 13 of the vehicle. While springs 22 and raceways 21 are used in the preferred embodiment, other means such as cams, rachets and latches are contemplated to achieve a generally flat surface while the tail gate 14 is rotated outward for loading and unloading purposes while retaining the capability to rotate the tail gate 14 into the body 10 such that it lies flat against the bed 13 to minimize air drag.

FIG. 3, showing the tail gate 14 in conventional loading mode, also illustrates how conventional tail gates extend outward to create dangerous driving conditions by providing an unapparent extension of the vehicle while obstructing visibility of signal lights 30 located at the rear bumper 31. By providing for inward rotation of the tail gate 14, the present invention discourages dangerous outward extension of the tail gate 14 to reduce air drag. It should be recognized that some loading can also occur while in the FIG. 1 mode.

Referring to FIG. 4, the tail gate 14 is shown in loading mode with the surfaces of 13 and 14 substantially level for loading convenience. The spring 22 is compressed allowing the pivot means 20 to move to the bottom of the raceway 21. To prevent rotation of the tail gate 14 outward past generally horizontal, stops 40 are provided which rotate along with the tail gate 14 without interferring with the spring caps 23 or the pivot means 20. When the tail gate rotates to outward horizontal, stops 40 contact the rear surface of the vehicle bed 13 to prevent further outward rotation. In addition, the stops 40 provide means for retaining the pivots means 20 at the bottom of raceways 21 after the springs 22 have been compressed and the material weight on the tail gate has been removed by providing for cooperation between the cantilevered weight of the tail gate 14 and the stops 40 to promote static friction between the stops 40 and the rear of the bed 13. After material is loaded or unloaded, the tail gate 14 is manually returned to either hauling position without interfering with cargo or air drag reducing position by upward and forward rotation.

While this invention has been described in detail with particular references to a preferred embodiment thereof, it will be understood that variations and modifications can be effective within the spirit and scope of the invention described hereinbefore and as defined in the appended claims.

I claim:

1. In a vehicle of the type having a cargo compartment formed by at least two side walls and a bed, the improvement comprising an air drag reducing tail gate adapted to rotate about an axis parallel to and substantially coincident with its lower edge to move into the cargo compartment of the vehicle and become aligned in air drag reducing position adjacent to said bed to minimize air drag and increase fuel efficiency while retaining maximum utility and safety.

2. The apparatus of claim 1 further comprising means for retaining said tail gate in said adjacent alignment.

3. The apparatus of claim 1 wherein said tail gate is further adapted to move outward, away from said compartment to provide for ease of loading and return to a generally vertical hauling position without interferring with cargo.

4. The apparatus of claim 3 further comprising:
   (a) pivot means interconnecting said tail gate and said vehicle upon which said tail gate rotates; and
   (b) means for permitting said pivot means to move in vertical directions to positions comprising an upper position which promotes parallel alignment of said bed and said tail gate while in air drag reducing position which assures substantially uniform contact therebetween for promoting stable support thereof, and a lower position which promotes loading convenience by providing a substantially level horizontal alignment of said tail gate with said bed.

5. The apparatus of claim 4 wherein means (b) further comprises:
   (a) a pair of vertically oriented raceways inscribed within sections of said side walls, and adapted to receive said pivot means, each having an upper end corresponding to said upper position, and a lower end corresponding to said lower position; and
   (b) spring means adapted to constantly exert an upward force against said tail gate about equal to the weight of said tail gate.

6. The apparatus of claim 5 further comprising stop means for limiting the outward and downward rotation of said tail gate to about horizontal and level with said bed.

7. The apparatus of claim 6 wherein said stop means is adapted to retain said pivot means in the lower position of said raceways by providing for static friction at stopping surfaces for cooperating with the weight of said tail gate in said cantilevered loading position to overcome the force of said spring means.

8. The apparatus of claim 4 further comprising a positon which is adapted to provide for alignment of securement means when said tail gate is generally vertical in hauling position.

* * * * *